US012176515B2

(12) United States Patent
Osumi et al.

(10) Patent No.: US 12,176,515 B2
(45) Date of Patent: Dec. 24, 2024

(54) POSITIVE ELECTRODE COMPOSITION FOR LITHIUM ION SECONDARY BATTERIES, POSITIVE ELECTRODE FOR LITHIUM ION SECONDARY BATTERIES, AND LITHIUM ION SECONDARY BATTERY

(71) Applicants: Denka Company Limited, Tokyo (JP); Jiangxi University of Science and Technology, Jiangxi Sheng (CN)

(72) Inventors: Shinichiro Osumi, Tokyo (JP); Tatsuya Nagai, Tokyo (JP); Tetsuya Ito, Tokyo (JP); Sheng Wen Zhong, Jiangxi Sheng (CN); Jun Chen, Jiangxi Sheng (CN); Qian Zhang, Jiangxi Sheng (CN); Min Zeng, Jiangxi Sheng (CN)

(73) Assignees: Denka Company Limited, Tokyo (JP); Jiangxi University of Science and Technology, Jiangxi Sheng (CN)

( * ) Notice: Subject to any disclaimer, the term of this patent is extended or adjusted under 35 U.S.C. 154(b) by 306 days.

(21) Appl. No.: 16/754,736

(22) PCT Filed: Sep. 28, 2018

(86) PCT No.: PCT/JP2018/036513
§ 371 (c)(1),
(2) Date: Apr. 8, 2020

(87) PCT Pub. No.: WO2019/073830
PCT Pub. Date: Apr. 18, 2019

(65) Prior Publication Data
US 2020/0313159 A1 Oct. 1, 2020

(30) Foreign Application Priority Data

Oct. 10, 2017 (CN) .......................... 201710936706.2
Sep. 13, 2018 (CN) .......................... 201811068266.4

(51) Int. Cl.
*H01M 4/131* (2010.01)
*H01M 4/485* (2010.01)
*H01M 4/62* (2006.01)
*H01M 10/0525* (2010.01)
*H01M 4/02* (2006.01)

(52) U.S. Cl.
CPC ........... *H01M 4/131* (2013.01); *H01M 4/485* (2013.01); *H01M 4/625* (2013.01); *H01M 10/0525* (2013.01); *H01M 2004/028* (2013.01)

(58) Field of Classification Search
CPC ...... H01M 4/131; H01M 4/485; H01M 4/625; H01M 10/0525; H01M 2004/028; H01M 4/505; H01M 4/525; Y02E 60/10
See application file for complete search history.

(56) References Cited

U.S. PATENT DOCUMENTS

| | | | |
|---|---|---|---|
| 2006/0204855 A1* | 9/2006 | Saruwatari | H01M 10/0568 429/339 |
| 2010/0140554 A1* | 6/2010 | Oki | H01M 4/625 252/500 |
| 2012/0171566 A1 | 7/2012 | Yoshitake et al. | |
| 2013/0313486 A1 | 11/2013 | Sugimori et al. | |
| 2014/0315089 A1* | 10/2014 | Yu | H01M 4/505 429/223 |
| 2015/0171421 A1* | 6/2015 | Akikusa | H01M 4/133 264/105 |
| 2016/0308199 A1* | 10/2016 | Noguchi | H01M 4/525 |

FOREIGN PATENT DOCUMENTS

| | | |
|---|---|---|
| JP | 11-176446 A | 7/1999 |
| JP | 2001-126733 A | 5/2001 |
| JP | 2007-80652 A | 3/2007 |
| JP | 2008-181714 A | 8/2008 |
| JP | 2010-238575 A | 10/2010 |
| JP | 2015-115106 A | 6/2015 |
| JP | 2017-182989 A | 10/2017 |
| WO | 2012114590 A1 | 8/2012 |
| WO | 2013179909 A1 | 12/2013 |
| WO | 2017166147 A1 | 10/2017 |

OTHER PUBLICATIONS

Cho et al., Conversion of natural gas to hydrogen and carbon black by plasma and application of plasma black, Prepr. Pap.-Am. Chem. Soc., Div. Fuel Chem. 2004, 49 (1), 182. (Year: 2004).*
Extended European Search Report dated Sep. 29, 2020.
English-language abstract for JPH 11176446 (1999).
English-language abstract for JP 2001126733 (2001).
English-language abstract for JP 2007080652 (2007).
English-language abstract for JP 2010238575 (2010).
English-language abstract for JP 2015115106 (2015).
English-language abstract for JP 2017182989 (2017).
English-language abstract for WO 2013179909 (2013).

* cited by examiner

*Primary Examiner* — Cynthia K Walls
(74) *Attorney, Agent, or Firm* — Caesar Rivise, PC

(57) ABSTRACT

According to various aspects of the present invention, a positive electrode composition for a lithium-ion secondary battery includes an active material capable of inserting and extracting lithium ions, and a conductor, wherein the active material is a lithium-nickel-cobalt-manganese complex oxide; the conductor is a carbon black and carbon nanotubes; the carbon black has a BET specific surface area of 100 to 400 $m^2/g$, and a DBP absorption of 210 to 380 ml/100 g; and the carbon nanotubes have an average diameter of 7 to 15 nm.

3 Claims, No Drawings

POSITIVE ELECTRODE COMPOSITION FOR LITHIUM ION SECONDARY BATTERIES, POSITIVE ELECTRODE FOR LITHIUM ION SECONDARY BATTERIES, AND LITHIUM ION SECONDARY BATTERY

CROSS-REFERENCE TO RELATED APPLICATIONS

This application is the U.S. National Phase Application of PCT/JP2018/036513, filed Sep. 28, 2018, which claims priority from CN 201710936706.2, filed Oct. 10, 2017 and CN 201811068266.4, filed Sep. 13, 2018, the contents of which applications are incorporated herein by reference in their entireties for all purposes.

FIELD OF THE INVENTION

The present invention relates to a positive electrode composition for a lithium-ion secondary battery, a positive electrode for a lithium-ion secondary battery, and a lithium-ion secondary battery.

BACKGROUND OF THE INVENTION

As environmental and energy problems are increasingly drawing attention, development of techniques for achieving a low-carbon society in which the dependence on fossil fuels is reduced is being vigorously conducted. Examples of such technical developments include development of low-emission vehicles, such as a hybrid electric vehicle and an electric vehicle, development of natural energy power generation and storage system, such as photovoltaic power generation or wind power generation, and development of next-generation power transmission grid which efficiently supplies electric power to reduce loss of power transmission, and they are over a wide range of techniques.

One of the indispensable key devices common to these techniques is a battery, and, with respect to the battery, a high energy density is required for downsizing the system. In addition, high output characteristics without being affected by the temperature of the environment in which the battery is used are required for enabling stable supply of electric power. Further, excellent cycle characteristics and the like are required so as to achieve a durability to long-term use. For this reason, replacement of conventional lead storage battery, nickel-cadmium battery, and nickel-hydrogen battery with a lithium-ion secondary battery having higher energy density, output characteristics, and cycle characteristics has proceeded rapidly.

A basic configuration of the lithium-ion secondary battery comprises a positive electrode, a negative electrode, a separator, and an electrolyte, and the positive electrode generally has a positive electrode composition containing a positive electrode active material such as a lithium complex oxide, a conductor, and a binder; and a current collector of metallic foil such as aluminum. As the conductor, generally, a carbon material in a particulate form, such as carbon black, is used.

By the way, carbon black has a common structure in which primary particles in nearly a spherical shape are linked in a row, and such a structure of carbon black is called the structure. The length of the structure is generally indirectly evaluated using a DBP absorption as measured in accordance with JIS K6217-4, and the larger the DBP absorption is, the longer the structure is, and the more excellent the electrical conduction properties are.

In recent years, the lithium-ion secondary battery having further improved energy density and battery performance is desired. Therefore, it is required to further reduce the content of the conductor, which is a component that does not contribute to the charge/discharge capacity in the electrode. Accordingly, there has been proposed a technique in which a fibrous carbon material having a higher aspect ratio than a particulate carbon material such as carbon black and capable of improving conductivity with a smaller amount is used in combination as a conductor.

In Patent Literature 1, a proposal is made in which carbon nanofiber serves as an electrical bridge between active material and carbon black to create an extremely excellent conducting path in the electrode, so that a battery having excellent cycle characteristics can be obtained. However, when using carbon black having a small particle diameter and a long structure, which is expected to improve the electrical conduction properties in a smaller amount, a problem is caused in that an excellent conducting path cannot be sufficiently created, making it impossible to obtain practically satisfying performance.

In Patent Literature 2, a proposal has been made in which carbon black and carbon nanotubes are used in combination to prevent the conductor from being unevenly distributed in the electrode, so that a battery having excellent output characteristics can be obtained. However, the battery is assumed to use carbon black having a small particle diameter and a short structure. Therefore, when using carbon black having a small particle diameter and a long structure, which is expected to have more excellent electrical conduction properties, a problem arises in that aggregation is caused due to entanglement of the structures and causing the conductor to be unevenly distributed in the electrode, making it impossible to obtain practically satisfying performance.

In Patent Literature 3, a proposal has been made in which when the whole of the conductor is taken as 100% by weight, the proportion of fibrous carbon material is set to 1 to 20% by weight and the proportion of particulate carbon material is set to 99 to 80% by weight, thereby improving the electrical conduction properties in the electrode, so that a battery having excellent cycle characteristics and output characteristics can be obtained. However, because the proportion of the particulate carbon material is large, when using carbon black having a small particle diameter and a long structure, which is expected to have excellent electrical conduction properties, a problem arises in that aggregation is caused due to entanglement of the structures and causing the conductor to be unevenly distributed in the electrode, making it impossible to obtain practically satisfying performance.

In Patent Literature 4, a proposal has been made in which carbon black and graphitized carbon fiber are used in combination to create a stable conducting path in the positive electrode, so that a battery having excellent output characteristics and cycle characteristics can be obtained. Further, in Patent Literature 5, a proposal is made in which carbon black and fibrous carbon are used in combination, so that a battery having a low resistance and excellent discharge capacity and cycle characteristics is obtained. However, in both cases, the fibrous carbon material has a large fiber diameter, and a large amount of the fibrous carbon material is required for creating a favorable conducting path. Therefore, a problem arises in that the proportion of the carbon black which is expected to have an excellent ability to hold an electrolytic solution is decreased, so that the output characteristics of the battery being used in a low-temperature environment become unsatisfying from a practical point of view.

CITATION LIST

Patent Literature

[Patent Literature 1] WO2013/179909
[Patent Literature 2] Japanese Patent Application No. 2007-80652
[Patent Literature 3] Japanese Patent Application No. H11-176446
[Patent Literature 4] Japanese Patent Application No. 2001-126733
[Patent Literature 5] Japanese Patent Application No. 2010-238575

SUMMARY OF THE INVENTION

In view of the above problems and facts, the object of the present invention is to provide a positive electrode composition for a lithium-ion secondary battery, which can easily obtain a lithium-ion secondary battery having a small internal resistance, excellent output characteristics, excellent cycle characteristics, and excellent low-temperature characteristics.

The present inventors have conducted extensive and intensive studies. As a result, it has been found that, by using carbon black having a small particle diameter and a long structure and carbon nanotubes having a small fiber diameter in combination with a specific active material, the above problem can be solved.

Specifically, in the present invention, a lithium-ion secondary battery produced using a positive electrode composition for a lithium-ion secondary battery, which comprises a lithium-nickel-cobalt-manganese complex oxide as an active material, and as a conductor a carbon black having a small particle diameter and a long structure and carbon nanotubes having a small fiber diameter, has a small internal resistance, excellent output characteristics, excellent cycle characteristics, and excellent low-temperature characteristics.

In other words, the present invention is specified as below.
(1) A positive electrode composition for a lithium-ion secondary battery, comprising an active material capable of inserting and extracting lithium ions, and a conductor, wherein
the active material is a lithium-nickel-cobalt-manganese complex oxide;
the conductor is a carbon black and carbon nanotubes;
the carbon black has a BET specific surface area of 100 to 400 $m^2/g$, and a DBP absorption of 210 to 380 ml/100 g; and
the carbon nanotubes have an average diameter of 7 to 15 nm.
(2) The positive electrode composition for a lithium-ion secondary battery according to (1), wherein the lithium-nickel-cobalt-manganese complex oxide has a BET specific surface area of 0.20 to 0.55 $m^2/g$.
(3) The positive electrode composition for a lithium-ion secondary battery according to (1) or (2), wherein a content X (unit: % by mass) of the carbon black and a content Y (unit: % by mass) of the carbon nanotubes in the positive electrode composition satisfy the following conditions (A) and (B):

$1.0 \leq (X+Y) \leq 3.0$, (A)

$0.65 \leq \{X/(X+Y)\} \leq 0.75$. (B)

(4) A positive electrode for a lithium-ion secondary battery, which comprises the positive electrode composition for a lithium-ion secondary battery according to any one of (1) to (3).
(5) A lithium-ion secondary battery comprising the positive electrode for a lithium-ion secondary battery according to (4).

According to the present invention, it is possible to provide a positive electrode composition for a lithium-ion secondary battery, which can easily provide a lithium-ion secondary battery having a small internal resistance, excellent output characteristics, excellent cycle characteristics, and excellent low-temperature characteristics.

DETAILED DESCRIPTION OF THE INVENTION

Hereinbelow, the present invention will be described in detail. The positive electrode composition for a lithium-ion secondary battery according to the present invention is a positive electrode composition for a lithium-ion secondary battery, comprising an active material and a conductor, wherein the active material is a lithium-nickel-cobalt-manganese complex oxide, the conductor is carbon black and carbon nanotubes, the carbon black has a BET specific surface area of 100 to 400 $m^2/g$, and has a DBP absorption of 210 to 380 ml/100 g, and the carbon nanotubes have an average diameter of 7 to 15 nm.

The active material in the present invention is lithium-nickel-cobalt-manganese complex oxide. The lithium-nickel-cobalt-manganese complex oxide, like a lithium-nickel-cobalt-manganese complex oxide used as a general active material for a battery, is selected from $LiNi_{0.8}Mn_{0.1}Co_{0.1}O_2$, $LiNi_{0.6}Mn_{0.2}CO_{0.2}O_2$, $LiNi_{0.5}Mn_{0.3}Co_{0.2}O_2$, $LiNi_{0.4}Mn_{0.4}Co_{0.2}O_2$ or $LiNi_{1/3}Mn_{1/3}CO_{1/3}O_2$, and the like. Among these, $LiNi_{0.5}Mn_{0.3}Co_{0.2}O_2$ which has an excellent balance on electrical conduction properties, capacity, and cycle characteristics is preferable.

It is preferred that the lithium-nickel-cobalt-manganese complex oxide in the present invention has a BET specific surface area of 0.20 to 0.55 $m^2/g$. When the BET specific surface area of the lithium-nickel-cobalt-manganese complex oxide is 0.20 $m^2/g$ or more, electrical contacts with a current collector and the conductor are increased, so that high utilization efficiency of the active material can be achieved. Further, when the BET specific surface area of the lithium-nickel-cobalt-manganese complex oxide is 0.55 $m^2/g$ or less, the interaction between the particles is suppressed, and therefore the lithium-nickel-cobalt-manganese complex oxide is well-dispersed in the positive electrode composition, so that high utilization efficiency of the active material can be obtained.

The conductor according to the present invention is carbon black and carbon nanotubes. The carbon black, like carbon black used as a general conductor for a battery, is selected from acetylene black, furnace black, channel black, and the like. Among these, acetylene black which has excellent crystalline properties and excellent purity is preferable.

The carbon black in the present invention has a BET specific surface area of 100 to 400 $m^2/g$. When the BET specific surface area of the carbon black is 100 $m^2/g$ or more, electrical contacts of the carbon black with the active material and a current collector are increased, so that excellent electronic conduction properties can be achieved. Further, when the BET specific surface area of the carbon black is 400 $m^2/g$ or less, the interaction between the particles is suppressed, and therefore the carbon black is well-dispersed in the positive electrode composition, so that excellent electrical conduction properties can be achieved. From this point of view, the BET specific surface area of the carbon black is preferably 100 to 210 m²/g, more preferably 100 to 160 m²/g.

The carbon black in the present invention has a DBP absorption of 210 to 380 ml/100 g. When the DBP absorption of the carbon black is 210 ml/100 g or more, the structure of the carbon black being used as a conductor has a satisfying length, so that excellent electrical conduction properties can be achieved. Further, when the DBP absorption of the carbon black is 380 ml/100 g or less, the occurrence of aggregation due to entanglement of the structures is suppressed, and therefore the carbon black is well-dispersed in the positive electrode composition, so that excellent electrical conduction properties can be achieved. From this point of view, the DBP absorption of carbon black is preferably 240 to 280 ml/100 g.

With respect to the volume resistivity of the carbon black according to the present invention, there is no particular limitation, but from the viewpoint of the electrical conduction properties, the volume resistivity of the carbon black is preferably smaller. Specifically, the carbon black preferably has a volume resistivity of 0.30 Ω·cm or less, more preferably 0.25 Ω·cm or less, as measured under a compression at 7.5 MPa.

With respect to the ash content and moisture content of the carbon black according to the present invention, there is no particular limitation, but from the viewpoint of suppression of a side reaction, both of them are preferably smaller. Specifically, the ash content is preferably 0.04% by mass or less, and the moisture content is preferably 0.10% by mass or less.

The carbon nanotubes in the present invention have an average diameter of 7 to 15 nm. When the average diameter of the carbon nanotubes is 7 nm or more, the occurrence of aggregation due to entanglement of the nanotubes is suppressed, and thus the carbon nanotubes are well-dispersed in the positive electrode composition, so that excellent electrical conduction properties can be achieved. Further, when the average diameter of the carbon nanotubes is 15 nm or less, electrical contacts of the carbon nanotubes with the active material and a current collector are increased, so that excellent electronic conduction properties can be achieved. From this point of view, the average diameter of carbon nanotubes is preferably 7 to 11 nm.

It is preferable that a content X (unit: % by mass) of the carbon black and a content Y (unit: % by mass) of the carbon nanotubes according to the present invention satisfy: $1.0 \leq (X+Y) \leq 3.0$, and $0.65 \leq \{X/(X+Y)\} \leq 0.75$. When the relationship: $1.0 \leq (X+Y) \leq 3.0$ is satisfied, the content of the conductor, which is a component that does not contribute to the charge/discharge capacity, in the positive electrode composition can be reduced, and further satisfying electrical conduction properties can be maintained. Further, when the relationship: $0.65 \leq \{X/(X+Y)\} \leq 0.75$ is satisfied, the carbon black and carbon nanotubes act as a complex bridge in the positive electrode composition, so that excellent electrical conduction properties can be achieved.

For manufacturing the positive electrode composition for a lithium-ion secondary battery according to the present invention, a publicly known method can be used. For example, the positive electrode composition is obtained by mixing a solvent dispersion solution of a positive electrode active material, a conductor, and a binder using a ball mill, a sand mill, a two-shaft kneader, a planetary centrifugal agitator, a planetary mixer, a disperser mixer, or the like, and generally is used in the form of a slurry. With respect to the positive electrode active material and the conductor, the above-mentioned ones may be used. The carbon black and the carbon nanotubes may be separately charged into a mixer or may be mixed together in advance by a publicly known method. Examples of binders include polymers, such as polyvinylidene fluoride, polytetrafluoroethylene, a styrene-butadiene copolymer, polyvinyl alcohol, an acrylonitrile-butadiene copolymer, and a carboxylic acid-modified (meth) acrylate copolymer. Among these, from the viewpoint of oxidation resistance, polyvinylidene fluoride is preferable. Examples of dispersing media include water, N-methyl-2-pyrrolidone, cyclohexane, methyl ethyl ketone, and methyl isobutyl ketone. When using polyvinylidene fluoride as a binder, from the viewpoint of the solubility, N-methyl-2-pyrrolidone is preferable.

Further, the positive electrode composition for a lithium-ion secondary battery according to the present invention may comprise a component other than the positive electrode active material, the conductor, the binder, and the dispersing medium in such an amount that the effects of the present invention are not sacrificed. For example, for the purpose of improving the dispersibility, the positive electrode composition may contain polyvinylpyrrolidone, polyvinylimidazole, polyethylene glycol, polyvinyl alcohol, polyvinyl butyral, carboxymethyl cellulose, acetylcellulose, a carboxylic acid-modified (meth)acrylate copolymer, or the like.

With respect to the positive electrode for a lithium-ion secondary battery according to the present invention, the above-mentioned slurry is applied to a current collector of metallic foil such as aluminum, and then the solvent contained in the slurry is removed by heating to form an electrode mixture layer which is a porous material having the positive electrode active material bound to the surface of the current collector with the binder. Further, the current collector and the electrode mixture layer may be pressed by a roller press or the like so that they closely adhere to each other, thereby obtaining an intended electrode.

With respect to the method for manufacturing the lithium-ion secondary battery according to the present invention, there is no particular limitation, and a conventionally known method for manufacturing a secondary battery may be used, but for example, the lithium-ion secondary battery can be manufactured by the method described below. Specifically, the lithium-ion secondary battery can be manufactured by disposing a polyolefin microporous film serving as an insulating layer between a positive electrode and a negative electrode, and injecting a non-aqueous electrolytic solution until the electrolytic solution satisfactorily penetrates the void portions of the positive electrode, negative electrode, and polyolefin microporous film.

With respect to the use of the lithium-ion secondary battery according to the present invention, there is no particular limitation, but the lithium-ion secondary battery can be used in a wide variety of fields, for example, portable AV devices, such as a digital camera, a video camera, a portable audio player, and a portable liquid crystal television; portable information terminals, such as a laptop personal computer, a smartphone, and a mobile PC; and others such as a portable game machine, an electric tool, a power-assisted bicycle, a hybrid vehicle, an electric vehicle, and an electric power storage system.

EXAMPLES

Hereinbelow, the positive electrode composition for a lithium-ion secondary battery of the present invention will be described in detail with reference to the following Examples and Comparative Examples. However, the present invention is not limited to the following examples unless it exceeds the gist of the present invention.

Example 1

(Positive Electrode Composition for a Lithium-Ion Secondary Battery)

A lithium-nickel-cobalt-manganese complex oxide $LiNi_{0.5}Mn_{0.3}Co_{0.2}O_2$ having a BET specific surface area of 0.48 m$^2$/g ("S532", manufactured by Jiangxi Jiangte Lithium Battery Materials Co., Ltd.) as an active material, a carbon black having a BET specific surface area of 133 m$^2$/g and a DBP absorption of 267 ml/100 g ("Li-435", manufactured by Denka Co., Ltd.) as a conductor, and a N-methylpyrrolidone solution of carbon nanotubes having an average diameter of 9 nm ("LB107", manufactured by CNano Technology Ltd.) as a conductor were prepared. With respect of an amount of 96% by mass of the lithium-nickel-cobalt-manganese complex oxide, the carbon black in an amount of 1.4% by mass, and the carbon nanotubes in an amount of 0.60% by mass in terms of the solute content, a N-methylpyrrolidone solution of polyvinylidene fluoride as a binder in an amount of 2.0% by mass in terms of the solute content, and further N-methylpyrrolidone as a dispersing medium were added, and they were mixed to obtain a positive electrode composition for a lithium-ion secondary battery.

(Positive Electrode for a Lithium-Ion Secondary Battery)

The positive electrode composition for a lithium-ion secondary battery was applied to an aluminum foil having a thickness of 20 μm using a Baker type applicator, and then dried, followed by pressing and cutting, to obtain a positive electrode for a lithium-ion secondary battery.

(Negative Electrode for a Lithium-Ion Secondary Battery)

A mixture of a composite comprising a graphite ("AGP-2A", manufactured by Shenzhen BTR Co., Ltd.) in an amount of 95% by mass, a carbon black ("Li-400", manufactured by Denka Co., Ltd.) in an amount of 1.0% by mass, a polyvinylidene fluoride in an amount of 1.5% by mass, and a styrene-butadiene copolymer in an amount of 2.5% by mass was applied to a copper foil having a thickness of 20 μm using a Baker type applicator, and then dried, followed by pressing and cutting, to obtain a negative electrode for a lithium-ion secondary battery.

(Lithium-Ion Secondary Battery)

The above-described positive electrode, a separator ("Celgard", manufactured by LLC Corp., USA) and the above-described negative electrode were stacked and laminated together, then packed and pre-sealed with an aluminum laminated film, subsequently injected with an electrolyte, and subjected to battery formatting, and vacuum sealing, and thereby a laminated type lithium-ion secondary battery was obtained.

[Internal Resistance]

The prepared lithium-ion secondary battery was charged and discharged in a voltage range of 2.75 to 4.2 V for 5 cycles. An impedance analysis was performed in a frequency range of 10 MHz to 0.001 Hz with a vibration voltage of 5 mV. The internal resistance of the present Example was found to be 3.75 mΩ.

[Output Characteristics (Capacity Retention Rate in 3 C Discharging)]

The prepared lithium-ion secondary battery was charged at 25° C. with a limitation of a constant current and a constant voltage of 4.2V and 0.2 C, and then discharged to 2.75 V at a constant current of 0.2 C. Next, the discharge current was changed to 0.2 C and 3 C, and the discharge capacity for each discharge current was measured. Then, the capacity retention rate at the time of 3 C discharge with respect to the 0.2 C discharge was calculated. The capacity retention rate at the time of 3 C discharge in this example was 96.5%.

[Cycle Characteristics (Cycle Capacity Retention Rate)]

The prepared lithium-ion battery was charged at 25° C. with a limitation of a constant current and a constant voltage of 4.2V and 1 C, and then discharged to 2.75 V at a constant current of 6 C. The cycle of charge and discharge was repeated, and the ratio of the discharge capacity at the 800th cycle to the discharge capacity at the first cycle was determined and defined as the cycle capacity retention rate. The cycle capacity retention rate of this Example was 84.0%.

[Low Temperature Output Characteristics (Capacity Retention Rate in −20° C. Discharging)]

The prepared lithium-ion secondary battery charged at 25° C. with a limitation of a constant current and a constant voltage of 4.2V and 0.2 C, and then discharged to 2.75 V at a constant current of 1 C. Subsequently, the battery was charged at −20° C. limitation of a constant current and a constant voltage of 4.2V and 0.2 C, and then discharged to 2.75 V at a constant current of 1 C. Then, the capacity retention rate at the time of discharging at −20° C. with respect to the time of discharging at 25° C. was calculated. The capacity retention rate at the time of discharging at −20° C. in this Example was 63.9%.

Example 2

A positive electrode composition for a lithium-ion secondary battery, a positive electrode for a lithium-ion secondary battery, and a lithium-ion secondary battery were prepared by the same method as in Example 1 except that the content of the carbon black was changed to 1.2% by mass and that the content of the carbon nanotubes was changed to 0.80% by mass, and each evaluation was performed. The results are shown in Table 1.

Example 3

A positive electrode composition for a lithium-ion secondary battery, a positive electrode for a lithium-ion secondary battery, and a lithium-ion secondary battery were prepared by the same method as in Example 1 except that the content of the carbon black was changed to 1.6% by mass and that the content of the carbon nanotubes was changed to 0.40% by mass, and each evaluation was performed. The results are shown in Table 1.

Example 4

A positive electrode composition for a lithium-ion secondary battery, a positive electrode for a lithium-ion secondary battery, and a lithium-ion secondary battery were prepared by the same method as in Example 1 except that the content of the carbon black was changed to 0.63% by mass and that the content of the carbon nanotubes was changed to 0.27% by mass, and each evaluation was performed. The results are shown in Table 1.

Example 5

A positive electrode composition for a lithium-ion secondary battery, a positive electrode for a lithium-ion secondary battery, and a lithium-ion secondary battery were prepared by the same method as in Example 1 except that the content of the carbon black was changed to 2.2% by mass and that the content of the carbon nanotubes was changed to 0.93% by mass, and each evaluation was performed. The results are shown in Table 1.

Example 6

A positive electrode composition for a lithium-ion secondary battery, a positive electrode for a lithium-ion secondary battery, and a lithium-ion secondary battery were prepared by the same method as in Example 1 except that the lithium-nickel-cobalt-manganese complex oxide in Example 1 was changed to a lithium-nickel-cobalt-manganese complex oxide $LiNi_{0.5}Mn_{0.3}CO_{0.2}O_2$ having a BET specific surface area of 0.15 m$^2$/g ("L532", manufactured by Jiangxi Jiangte Lithium Battery Materials Co., Ltd.), and each evaluation was performed. The results are shown in Table 1.

Example 7

A positive electrode composition for a lithium-ion secondary battery, a positive electrode for a lithium-ion secondary battery, and a lithium-ion secondary battery were prepared by the same method as in Example 1 except that the lithium-nickel-cobalt-manganese complex oxide in Example 1 was changed to a lithium-nickel-cobalt-manganese complex oxide $LiNi_{1/3}Mn_{1/3}CO_{1/3}O_2$ having a BET specific surface area of 0.15 m$^2$/g ("L333", manufactured by Jiangxi Jiangte Lithium Battery Materials Co., Ltd.), and each evaluation was performed. The results are shown in Table 1.

Example 8

A positive electrode composition for a lithium-ion secondary battery, a positive electrode for a lithium-ion secondary battery, and a lithium-ion secondary battery were prepared by the same method as in Example 1 except that the carbon black in Example 1 was changed to a carbon black having a BET specific surface area of 382 m$^2$/g and a DBP absorption of 305 ml/100 g (manufactured by Denka Co., Ltd.), and each evaluation was performed. The results are shown in Table 1.

Comparative Example 1

A positive electrode composition for a lithium-ion secondary battery, a positive electrode for a lithium-ion secondary battery, and a lithium-ion secondary battery were prepared by the same method as in Example 1 except that the content of the carbon black was changed to 0% by mass and that the content of the carbon nanotubes was changed to 2.0% by mass, and each evaluation was performed. The results are shown in Table 2.

Comparative Example 2

A positive electrode composition for a lithium-ion secondary battery, a positive electrode for a lithium-ion secondary battery, and a lithium-ion secondary battery were prepared by the same method as in Example 1 except that the content of the carbon black was changed to 2.0% by mass and that the content of the carbon nanotubes was changed to 0% by mass, and each evaluation was performed. The results are shown in Table 2.

Comparative Example 3

A positive electrode composition for a lithium-ion secondary battery, a positive electrode for a lithium-ion secondary battery, and a lithium-ion secondary battery were prepared by the same method as in Example 1 except that the carbon black in Example 1 was changed to a carbon black having a BET specific surface area of 58 m$^2$/g and a DBP absorption of 200 ml/100 g ("Li-250", manufactured by Denka Co., Ltd.), and each evaluation was performed. The results are shown in Table 2.

Comparative Example 4

A positive electrode composition for a lithium-ion secondary battery, a positive electrode for a lithium-ion secondary battery, and a lithium-ion secondary battery were prepared by the same method as in Example 1 except that the carbon black in Example 1 was changed to a carbon black having a BET specific surface area of 877 m$^2$/g and a DBP absorption of 390 ml/100 g (manufactured by Lion Corporation.), and each evaluation was performed. The results are shown in Table 2.

Comparative Example 5

A positive electrode composition for a lithium-ion secondary battery, a positive electrode for a lithium-ion secondary battery, and a lithium-ion secondary battery were prepared by the same method as in Example 1 except that the carbon nanotubes in Example 1 were changed to carbon nanotubes having an average diameter of 5 nm (manufactured by WAKO CHEMICAL, CO., LTD.), and each evaluation was performed. The results are shown in Table 2.

Comparative Example 6

A positive electrode composition for a lithium-ion secondary battery, a positive electrode for a lithium-ion secondary battery, and a lithium-ion secondary battery were prepared by the same method as in Example 1 except that the carbon nanotubes in Example 1 were changed to carbon nanotubes having an average diameter of 25 nm (manufactured by WAKO CHEMICAL, CO., LTD.), and each evaluation was performed. The results are shown in Table 2.

Comparative Example 7

A positive electrode composition for a lithium-ion secondary battery, a positive electrode for a lithium-ion secondary battery, and a lithium-ion secondary battery were prepared by the same method as in Example 1 except that the carbon nanotubes in Example 1 were changed to vapor grown carbon fibers having an average diameter of 150 nm, and each evaluation was performed. The results are shown in Table 2.

TABLE 1

|  |  | Example 1 | Example 2 | Example 3 | Example 4 | Example 5 | Example 6 | Example 7 | Example 8 |
|---|---|---|---|---|---|---|---|---|---|
| Lithium-nickel-cobalt-manganese complex oxide | BET specific surface area (m$^2$/g) | 0.48 | 0.48 | 0.48 | 0.48 | 0.48 | 0.15 | 0.15 | 0.48 |
| Carbon black | BET specific surface area (m$^2$/g) | 133 | 133 | 133 | 133 | 133 | 133 | 133 | 382 |
|  | DBP absorption (ml/100 g) | 267 | 267 | 267 | 267 | 267 | 267 | 267 | 305 |
| Carbon nanotubes | Average diameter (nm) | 9 | 9 | 9 | 9 | 9 | 9 | 9 | 9 |
| X + Y |  | 2.0 | 2.0 | 2.0 | 0.9 | 3.1 | 2.0 | 2.0 | 2.0 |
| X/(X + Y) |  | 0.70 | 0.60 | 0.80 | 0.70 | 0.70 | 0.70 | 0.70 | 0.70 |
| Internal resistance (Ωcm) |  | 37.5 | 37.9 | 38.1 | 39.5 | 39.0 | 40.0 | 40.5 | 37.6 |
| Capacity retention rate in 3 C. discharge (%) |  | 96.5 | 95.4 | 94.9 | 94.0 | 94.5 | 91.0 | 90.0 | 96.2 |
| Cycle capacity retention rate (%) |  | 84.0 | 82.0 | 81.5 | 80.0 | 81.0 | 78.0 | 80.8 | 84.4 |
| Capacity retention rate in −20° C. discharge (%) |  | 63.9 | 62.0 | 62.5 | 61.0 | 62.0 | 58.0 | 58.0 | 63.6 |

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Lithium-nickel-cobalt-manganese complex oxide | BET specific surface area (m$^2$/g) | 0.48 | 0.48 | 0.48 | 0.48 | 0.48 | 0.48 | 0.48 |
| Carbon black | BET specific surface area (m$^2$/g) | — | 133 | 58 | 877 | 133 | 133 | 133 |
|  | DBP absorption (ml/100 g) | — | 267 | 200 | 390 | 267 | 267 | 267 |
| Carbon nanotubes | Average diameter (nm) | 9 | — | 9 | 9 | 5 | 25 | 150 |
| X + Y |  | 2.0 | 2.0 | 2.0 | 2.0 | 2.0 | 2.0 | 2.0 |
| X/(X + Y) |  | 0.00 | 1.00 | 0.70 | 0.70 | 0.70 | 0.70 | 0.70 |
| Internal resistance (Ωcm) |  | 47.0 | 48.0 | 46.0 | 45.0 | 46.0 | 47.5 | 45.0 |
| Capacity retention rate in 3 C. discharge (%) |  | 80.0 | 79.5 | 80.0 | 79.0 | 78.0 | 78.0 | 80.0 |
| Cycle capacity retention rate (%) |  | 70.0 | 68.0 | 70.0 | 70.0 | 71.0 | 67.0 | 67.0 |
| Capacity retention rate in −20° C. discharge (%) |  | 48.0 | 50.0 | 49.0 | 50.0 | 49.0 | 49.0 | 47.0 |

From the results shown in Table 1 and 2, it has been found that the lithium-ion secondary battery manufactured using the positive electrode composition for a lithium-ion secondary battery according to the present invention has a small internal resistance, excellent output characteristics, excellent cycle characteristics, and excellent low-temperature characteristics.

What is claimed is:

1. A positive electrode composition for a lithium-ion secondary battery, comprising an active material capable of inserting and extracting lithium ions, and a conductor, wherein the active material is a lithium-nickel-cobalt-manganese complex oxide having a BET specific surface area of 0.20 to 0.55 m$^2$/g;

the conductor is a carbon black and carbon nanotubes;

all the carbon black contained in the positive electrode composition has a BET specific surface area of 133 to 382 m$^2$/g, and a DBP absorption of 210 to 380 ml/100 g;

the carbon nanotubes have an average diameter of 7 to 15 nm; and a content X (unit: % by mass) of the carbon black and a content Y (unit: % by mass) of the carbon nanotubes in the positive electrode composition satisfy the following conditions (A) and (B):

$$(A) 1.0 \leq (X+Y) \leq 3.0,$$

$$(B) 0.65 \leq \{X/(X+Y)\} \leq 0.75.$$

2. A positive electrode for a lithium-ion secondary battery, which comprises the positive electrode composition for a lithium-ion secondary battery according to claim 1.

3. A lithium-ion secondary battery comprising the positive electrode for a lithium-ion secondary battery according to claim 2.

* * * * *